(12) United States Patent
Narasimhan et al.

(10) Patent No.: US 9,857,199 B2
(45) Date of Patent: Jan. 2, 2018

(54) STEERING POSITION SENSOR (MULTI-TURN 1440 DEGREES ANGLE POSITION SENSOR)

(71) Applicant: Honeywell International Inc., Morris Plains, NJ (US)

(72) Inventors: Kumaran Sena Narasimhan, Bangalore (IN); Gregory Furlong, Freeport, IL (US); Joel Stolfus, Freeport, IL (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/267,383

(22) Filed: Sep. 16, 2016

(65) Prior Publication Data

US 2017/0082457 A1     Mar. 23, 2017

(51) Int. Cl.
| | |
|---|---|
| *G01B 7/30* | (2006.01) |
| *G01D 5/14* | (2006.01) |
| *G01D 5/16* | (2006.01) |
| *G01M 17/06* | (2006.01) |

(52) U.S. Cl.
CPC ............... *G01D 5/142* (2013.01); *G01B 7/30* (2013.01); *G01D 5/145* (2013.01); *G01D 5/16* (2013.01); *G01M 17/06* (2013.01)

(58) Field of Classification Search
CPC . G01B 7/30; G01D 5/142; G01D 5/16; G01D 5/12; G01D 5/145; G01M 17/06
USPC ............................ 324/207.2, 207.21, 207.25
See application file for complete search history.

(56) References Cited

U.S. PATENT DOCUMENTS

| | | | |
|---|---|---|---|
| 8,004,277 B2 * | 8/2011 | Patil ................... | B62D 15/0215 |
| | | | 324/207.25 |
| 9,360,295 B2 * | 6/2016 | Taniguchi ............. | G01D 5/145 |
| 2004/0070392 A1 | 4/2004 | Hahn | |
| 2009/0140731 A1 | 6/2009 | Miyashita et al. | |
| 2015/0149112 A1 | 5/2015 | Von Berg | |

OTHER PUBLICATIONS

Combined Search and Examination Report; United Kingdom Patent Application No. 1615703.4; dated Feb. 28, 2017; 5 pages.
Office Action; China Patent Application No. 201621061808.1; dated Mar. 7, 2017; 4 pages.

* cited by examiner

*Primary Examiner* — Jay Patidar
(74) *Attorney, Agent, or Firm* — Conley Rose, P.C.

(57) ABSTRACT

A multi-turn angular position sensor includes a fixed magnet non-rotationally coupled to a fixed structure. A shaft is configured to rotate multiple complete rotations from a reference position, where each complete rotation front the reference position in a rotational direction defines a unique rotation zone of the shaft. Rotatable magnets surround the shaft and are disposed between the shaft magnet and the fixed magnet and are configured to rotate a different number of angular degrees than the shaft magnet. One of the rotatable magnets is a zone sensor magnet that rotates no more than one complete rotation from the reference position. A rotational zone sensor supplies a zone sensor output signal that indicates the unique rotation zone of the shaft. A shaft rotation sensor supplies a shaft rotation output signal representative of a number of angular degrees that the shaft rotates within each unique rotation zone.

20 Claims, 9 Drawing Sheets

| SHAFT ANGLE | ZONE SENSOR OUTPUT SIGNALS | | | ZONE OF ROTATION |
|---|---|---|---|---|
| | ZONE SENSOR #1 | ZONE SENSOR #2 | ZONE SENSOR #3 | |
| +720 | 0 | 0 | 0 | II |
| +630 | 0 | 0 | 0 | II |
| +540 | 0 | X | 0 | II |
| +450 | 0 | 0 | 0 | II |
| +360 | 0 | 0 | 1 | I |
| +270 | 0 | 0 | 1 | I |
| +180 | 0 | 0 | 1 | I |
| +90 | 0 | 0 | 1 | I |
| 0 | X | X | X | N/A |
| -90 | 1 | 1 | 0 | III |
| -180 | 1 | 1 | 0 | III |
| -270 | 1 | 1 | 0 | III |
| -360 | 1 | 1 | 0 | III |
| -450 | 1 | 1 | 1 | IV |
| -540 | 1 | X | 1 | IV |
| -630 | 1 | 1 | 1 | IV |
| -720 | 1 | 1 | 1 | IV |

X = DONT CARE

FIG. 9

STEERING POSITION SENSOR (MULTI-TURN 1440 DEGREES ANGLE POSITION SENSOR)

CROSS REFERENCE TO RELATED APPLICATIONS

The present application claims priority to India Provisional Patent Application No. 2959/DEL/2015 filed Sep. 18, 2015 by Kumaran Sena Narasimhan, et al. and entitled "STEERING POSITION SENSOR (MULTI-TURN 1440 DEGREES ANGLE POSITION SENSOR)," which is incorporated herein by reference as if reproduced in its entirety.

TECHNICAL FIELD

The present invention generally relates position sensors, and more particularly relates to a multi-turn angular position sensor.

BACKGROUND

Angular position sensors are used in myriad devices and systems to sense angular (e.g., rotational) position. In some instances, there is a need to sense multi-turn (e.g., >360-degrees) angular positions of a device. Many devices within the automotive and various other vehicular transport systems have such a need. An example of one particular device is a steering wheel. It is typically desirable to sense, for example, at least ±720-degrees of steering wheel rotation. This requires a sensor with a minimum sensing range of 1440-degrees. Unfortunately, few multi-turn angular position sensors with a minimum sensing range of 1440-degrees, and that exhibit adequate reliability, stability, and accuracy are presently available.

Hence, there is a need for a multi-turn angular position sensor that provides a minimum sensing range of 1440-degrees, and that exhibits adequate reliability, stability, and accuracy. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi-turn angular position sensor includes a fixed structure, a fixed magnet, a shaft, a shaft magnet, a plurality of rotatable magnets, a rotational zone sensor, and a shaft rotation sensor. The fixed magnet is non-rotationally coupled to the fixed structure. The shaft is configured to rotate, relative to the fixed structure, multiple complete rotations from a reference position, where each complete rotation from the reference position in a rotational direction defines a unique rotation zone of the shaft. The shaft magnet is coupled to the shaft and is configured to rotate therewith. The rotatable magnets surround the shaft and are disposed between the shaft magnet and the fixed magnet. Each rotatable magnet is configured, upon rotation of the shaft magnet, to rotate a different number of angular degrees than the shaft magnet. The plurality of magnets includes a zone sensor magnet that rotates no more than one complete rotation from the reference position when the shaft rotates the multiple complete rotations from the reference position. The rotational zone sensor is disposed adjacent to the zone sensor magnet and is configured to supply a zone sensor output signal that indicates the unique rotation zone of the shaft. The shaft rotation sensor is disposed adjacent to the shaft and is configured to supply a shaft rotation output signal representative of a number of angular degrees that the shaft rotates within each unique rotation zone.

In another embodiment, a multi-turn angular position sensor system includes a fixed structure, a fixed magnet, a shaft, a shaft magnet, a plurality of rotatable magnets, a rotational zone sensor, a shaft rotation sensor, and a processor. The fixed magnet is non-rotationally coupled to the fixed structure. The shaft is configured to rotate, relative to the fixed structure, multiple complete rotations from a reference position, where each complete rotation from the reference position in a rotational direction defines a unique rotation zone of the shaft. The shaft magnet is coupled to the shaft and is configured to rotate therewith. The rotatable magnets surround the shaft and are disposed between the shaft magnet and the fixed magnet. Each rotatable magnet is configured, upon rotation of the shaft magnet, to rotate a different number of angular degrees than the shaft magnet. The magnets include a zone sensor magnet that rotates no more than one complete rotation from the reference position when the shaft rotates the multiple complete rotations from the reference position. The rotational zone sensor is disposed adjacent to the zone sensor magnet, and is configured to supply a zone sensor output signal that indicates the unique rotation zone of the shaft; The shaft rotation sensor is disposed adjacent to the shaft and is configured to supply a shaft rotation output signal representative of a number of angular degrees that the shaft rotates within each unique rotation zone. The processor is coupled to receive the zone sensor output signal and the shaft rotation output signal and is configured, upon receipt thereof, to determine the rotational position of the shaft.

In yet another embodiment, a multi-turn angular position sensor system includes a fixed structure, a fixed magnet, a shaft, a shaft magnet, a plurality of rotatable magnets, a rotational zone sensor, a shaft rotation sensor, and a processor. The fixed magnet is non-rotationally coupled to the fixed structure. The shaft is configured to rotate, relative to the fixed structure, N-number of complete rotations from a reference position in a rotational direction, where each complete rotation from the reference position in the rotational direction defines a unique rotation zone of the shaft. The shaft magnet is coupled to the shaft and is configured to rotate therewith. The rotatable magnets surround the shaft and are disposed between the shaft magnet and the fixed magnet. Each rotatable magnet supplies a magnetic force, and each rotatable magnet is configured, upon rotation of the shaft magnet and in response to the magnetic force supplied thereto from adjacent rotatable magnets, to rotate a different number of angular degrees than the shaft magnet. The magnets include a zone sensor magnet that rotates no more than one complete rotation from the reference position when the shaft rotates the multiple complete rotations from the reference position. The rotational zone sensor is disposed adjacent to the zone sensor magnet, and is configured to supply a zone sensor output signal that indicates the unique rotation zone of the shaft. The shaft rotation sensor is disposed adjacent to the shaft and is configured to supply a shaft rotation output signal representative of a number of angular degrees that the shaft rotates within each unique rotation zone. The processor is coupled to receive the zone sensor output signal and the shaft rotation output signal and is configured, upon receipt thereof, to determine the rotational position of the shaft.

In still another embodiment, a multi-turn angular position sensor includes a fixed structure, a fixed magnet, a shaft, a shaft magnet, a plurality of rotatable magnets, a plurality of rotational zone sensors, and a shaft rotation sensor. The fixed magnet is non-rotationally coupled to the fixed structure. The shaft is configured to rotate, relative to the fixed structure, multiple complete rotations from a reference position, where each complete rotation from the reference position in a rotational direction defines a unique rotation zone of the shaft. The shaft magnet is coupled to the shaft and is configured to rotate therewith. The rotatable magnets surround the shaft and are disposed between the shaft magnet and the fixed magnet. Each rotatable magnet is configured, upon rotation of the shaft magnet, to rotate a different number of angular degrees than the shaft magnet. Each of the rotational zone sensors is disposed adjacent to a different one of the rotatable magnets, and is configured to supply zone sensor output signals representative of the unique rotation zone of the shaft. The shaft rotation sensor is disposed adjacent to the shaft and is configured to supply a shaft rotation output signal representative of a number of angular degrees of rotation within the unique rotation zone of the shaft.

Furthermore, other desirable features and characteristics of the multi-turn angular position sensor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIG. 9 is a table that depicts zone sensor output signals from the sensor of FIG. 8 at 90-degree rotational increments, and how the zone sensor output signals are used to determine the rotation zone of the shaft.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
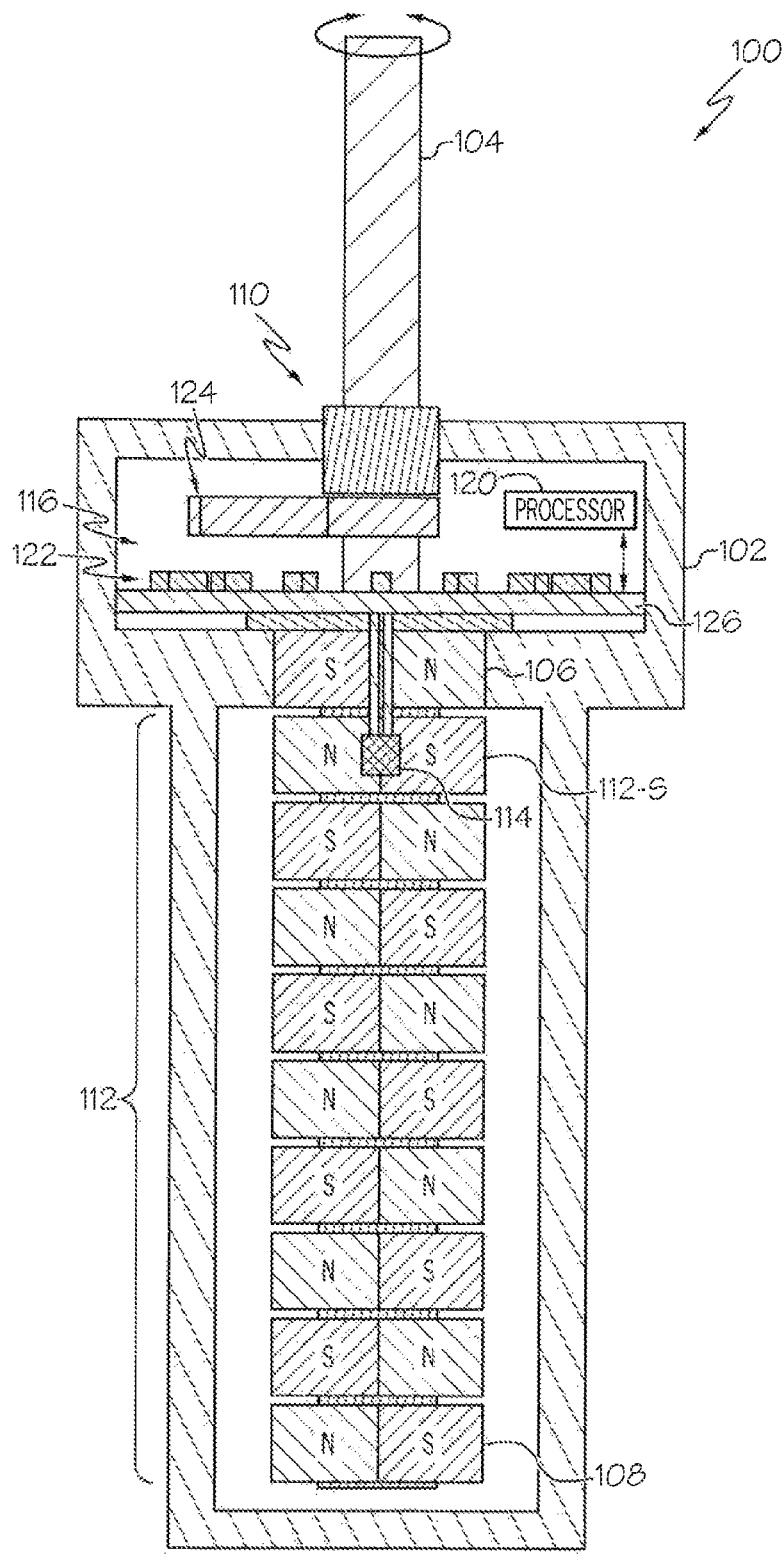
FIGS. 1 and 2 depict simplified cross section views of various exemplary embodiments of a multi-turn angular position sensing system.

Referring first to FIG. 1, a simplified cross section view of one embodiment of a multi-turn angular position sensor system 100 is depicted, and a multi-turn position sensor 110 and a processor 120. The multi-turn position sensor 110 includes a fixed structure 102, a shaft 104, a fixed magnet 106, a shaft magnet 108, a plurality of rotatable magnets 112, a rotational zone sensor 114, and a shaft rotation sensor 116. The fixed structure 102 may be variously configured. In the depicted embodiment, however, the fixed structure 102 is configured as a housing assembly that houses at least the fixed magnet 106, the shaft magnets 108, the rotatable magnets 112, the rotational zone sensor 114, and the shaft rotation sensor 116.

As FIG. 1 also depicts, the shaft 104 is at least partially disposed within, and extends from, the fixed structure 102, and is configured to rotate, in both a clockwise and a counterclockwise direction, relative to the fixed structure 102. More specifically, the shaft 104 is configured to rotate a plurality (e.g., N-number) of complete rotations from a reference position, which is the position depicted in FIG. 1, in each rotational direction. It will be appreciated that the number of complete rotations in each direction may vary, and may depend, for example, on the number of degrees of rotational position sensing capability. For example, if the shaft 104 is configured to rotate N-number of complete rotations in each direction, then (720×N)-degrees of rotational position sensing capability may be provided. In the particular embodiment depicted and described herein, the shaft 104 is configured to rotate at least 2 (e.g., N=2) complete rotations in each direction, thereby providing 1440-degrees of rotational position sensing capability. Though not depicted in any of the drawings, it will be appreciated that the shaft 104 is preferably connected to any one of numerous devices, such as a steering wheel, the rotational position of which is desired to be sensed.

Before proceeding further, it should be noted that each complete rotation of the shaft 104 from the reference position in each rotational direction defines a unique rotation zone. For example, whenever the shaft 104 is rotated within one complete revolution from the reference position in the clockwise direction, this is defined as rotation within a first rotation zone. Thereafter, if the shaft 104 is rotated beyond one complete revolution from the reference position in the clockwise direction, and is thus rotated between one and two complete revolutions from the reference position, this is defined as rotation within a second rotation zone, and so on. Similarly, whenever the shaft 104 is rotated within one complete revolution from the reference position in the counterclockwise direction, this is defined as rotation within a third rotation zone. Thereafter, if the shaft 104 is rotated beyond one complete revolution from the reference position in the counterclockwise direction, and is thus rotated between one and two complete revolutions from the reference position, this is defined as rotation within a fourth rotation zone, and so on.

Returning now to the description, it was noted above that the multi-turn angular position sensor system 100 also includes a plurality of magnets. These magnets include the fixed magnet 106, which is non-rotationally mounted to the fixed structure 102, the shaft magnet 108, which is coupled to and is configured to rotate with the shaft 104, and the plurality of rotatable magnets 112. All of the magnets 106, 108, 112 are dipole magnets, including both a north (N) and south (S) pole. As shown in FIG. 1, when the shaft 104 is in the reference position the magnets 106, 108, 112 are all aligned and symmetrically disposed, but with the poles alternatively staggered.

The rotatable magnets 112 surround the shaft 104 and are disposed between the fixed magnet 106 and the shaft magnet 108. The rotatable magnets 112 are free to rotate relative to the shaft 104 and the shaft magnet 108, but are also each configured, upon rotation of the shaft magnet 108, to rotate a different number of angular degrees than the shaft magnet 108. More specifically, each rotatable magnet 112, as is generally known, supplies a magnetic force. Thus, upon rotation of the shaft magnet 108, and in response to the magnetic force supplied to each rotatable magnet 112 from its adjacent magnets, each rotatable magnet 112 also rotates, through a different number of angular degrees than the shaft magnet 108. It will be appreciated that the number of rotatable magnets 112 may vary depending, for example, on the desired rotational position sensing capability. In the depicted embodiment, however, there are eight rotatable magnets 112.

The rotational zone sensor 114 is disposed adjacent to one of the rotatable magnets 112. In particular, the rotational zone sensor 114 is disposed adjacent to a rotatable magnet 112 that rotates no more than one complete rotation from the reference position when the shaft 104 rotates the multiple complete rotations from the reference position. This particular magnet is referred to herein as a zone sensor magnet 112-S. The rotational zone sensor 114 is in operable communication with the processor 120 and is configured to supply a zone sensor output signal to the processor 120 that is indicative of the unique rotation zone of the shaft 104. It will be appreciated that the type of rotational zone sensor 114 may vary. For example, the rotational zone sensor 114 may be implemented using a Hall sensor. It will be appreciated, however, that other types of sensors could also be used, if needed or desired. No matter the particular type of sensor that is used to implement the rotational zone sensor 114, and as will be described in more detail further below, the zone sensor output signal supplied thereby is an analog signal that identifies the unique zone of rotation of the shaft 104.

The shaft rotation sensor 116 is disposed adjacent to the shaft 104 and is configured to supply a shaft rotation output signal to the processor 120. The shaft rotation output signal is representative of the number of angular degrees the shaft 104 has been rotated within a rotation zone. Like the rotational zone sensor 114, the shaft rotation sensor 116 may also be variously implemented. In the embodiment depicted in FIG. 1, the shaft rotation sensor 116 is implemented using an anisotropic magnetic resistive (AMR) array 122 and a sensor magnet 124. The AMR array 122, at least in the depicted embodiment, is mounted on a circuit board 126. The sensor magnet 124 is disposed adjacent to the AMR array 122, and is coupled to, and is rotatable with, the shaft 104. In other embodiments, such as the one depicted in FIG. 2, the shaft rotation sensor 116 is implemented using a 360-degree Hall sensor that is disposed adjacent to, and is configured to sense rotations of, the shaft magnet 108.

The processor 120 is coupled to receive the zone sensor output signal from the rotational zone sensor 114 and the shaft rotation output signal from the shaft rotation sensor 116. The processor 120 is configured, upon receipt of these signals, to determine the rotational position of the shaft 104, and to supply an output representative of the determined rotational position of the shaft 104. The processor 120, which may be variously implemented, is depicted as being disposed within the fixed structure (e.g., housing assembly). It will be appreciated that this is merely done for convenience, and that the processor 120 may be disposed remote from the fixed structure 102, if needed or desired.

Figure 3:
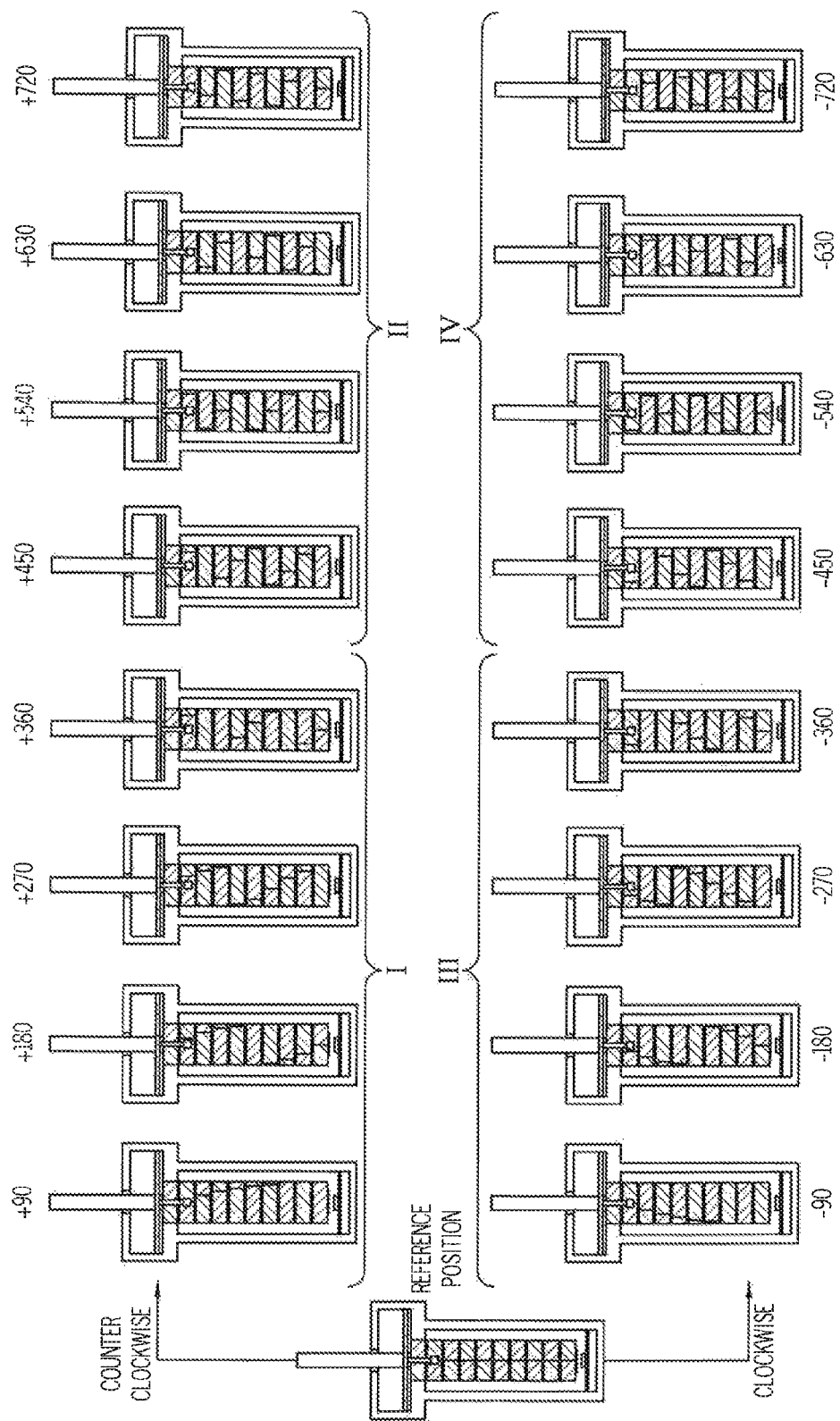
FIG. 3 depicts the multi-turn angular position sensor of FIG. 2 in multiple rotational positions.
Figure 4:
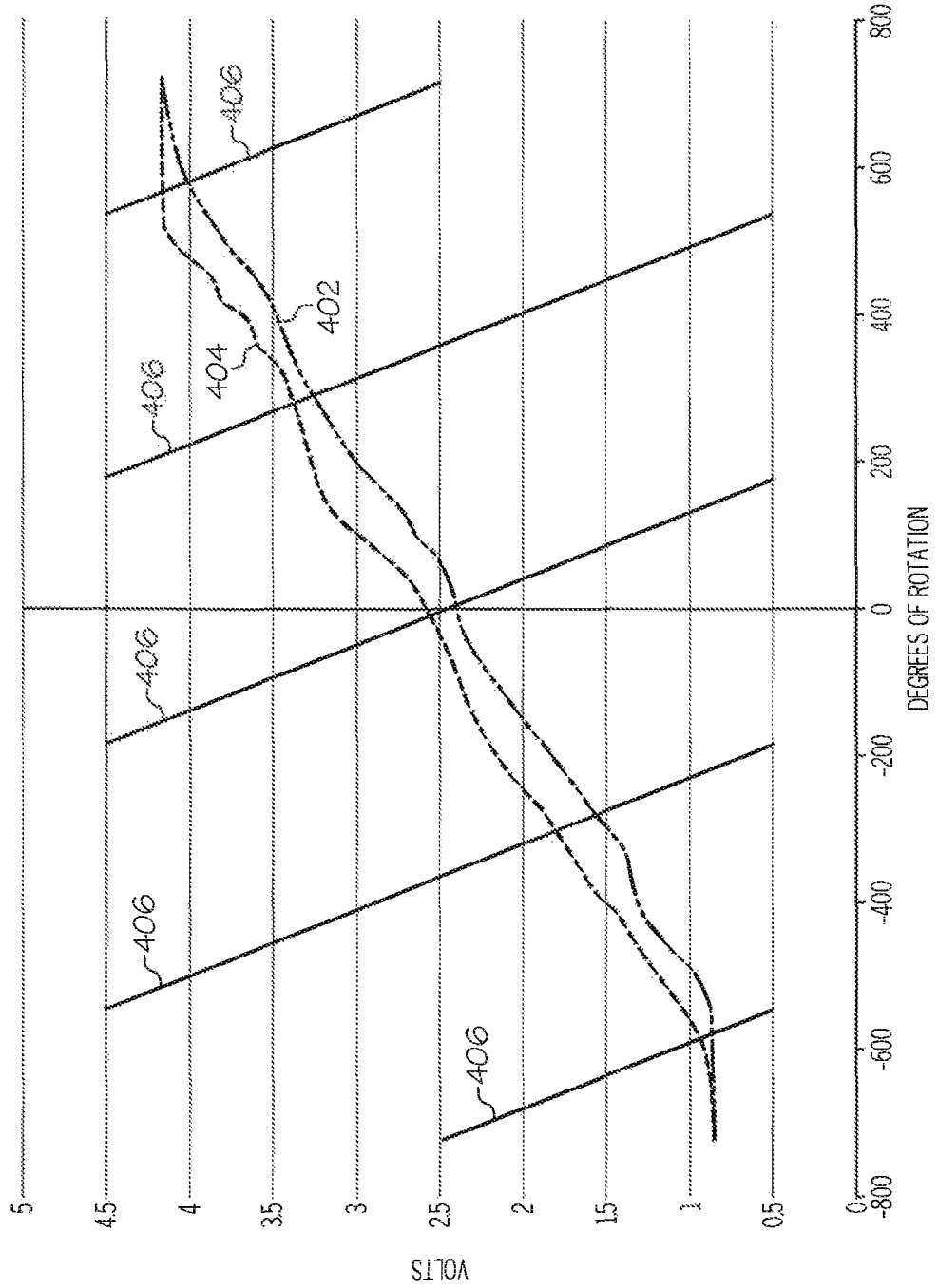
FIG. 4 graphically depicts the variations in output signals from the multi-turn angular position sensor of FIG. 2 when the shaft is rotated in the clockwise and counterclockwise directions from the reference position.

Having described the overall structure of the multi-turn angular position sensing system 100, and the structure and function of the individual components that comprise the system 100, a description will now be provided as to how the system 100 senses the rotational position of the shaft 104. In doing so, reference should be made to FIGS. 3 and 4. FIG. 3 depicts the positions of the shaft magnet 108 and rotatable magnets 112 when the shaft 104 is rotated, in 90-degree increments, in both the clockwise and counter clockwise direction. FIG. 4 graphically depicts the variations in the zone sensor output signal and the shaft rotation output signal when the shaft is rotated in the clockwise and counterclockwise directions from the reference position. In particular, 402 represents the zone sensor output signal when the shaft 104 is rotated in the clockwise direction from −720 to +720 degrees, 404 represents the zone sensor output signal when the shaft 104 is rotated in the counterclockwise direction 404 from +720 to −720 degrees, and 406 represents the shaft sensor output signal when the shaft is rotated in the clockwise and counterclockwise directions. As may be readily apparent from FIG. 4, the processor 120 uses the magnitude of the zone sensor output signal to determine the unique rotation zone of the shaft 104, and uses the shaft sensor output signal to determine the specific rotational position of the shaft 104 within the rotation zone.

Figure 5:
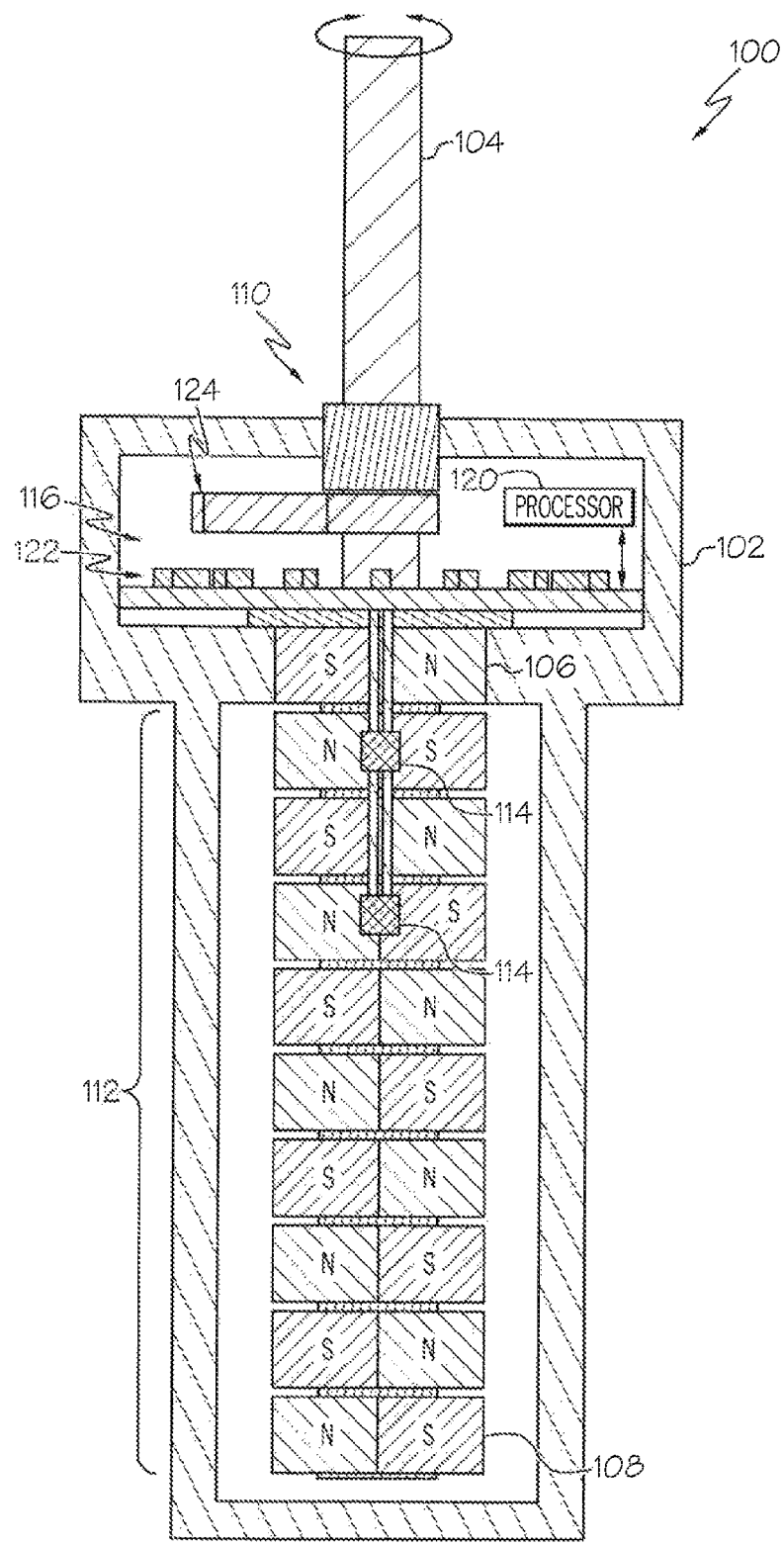
FIGS. 5-7 depict simplified cross section views of various alternative exemplary embodiments of a multi-turn angular position sensing system.
Figure 6:
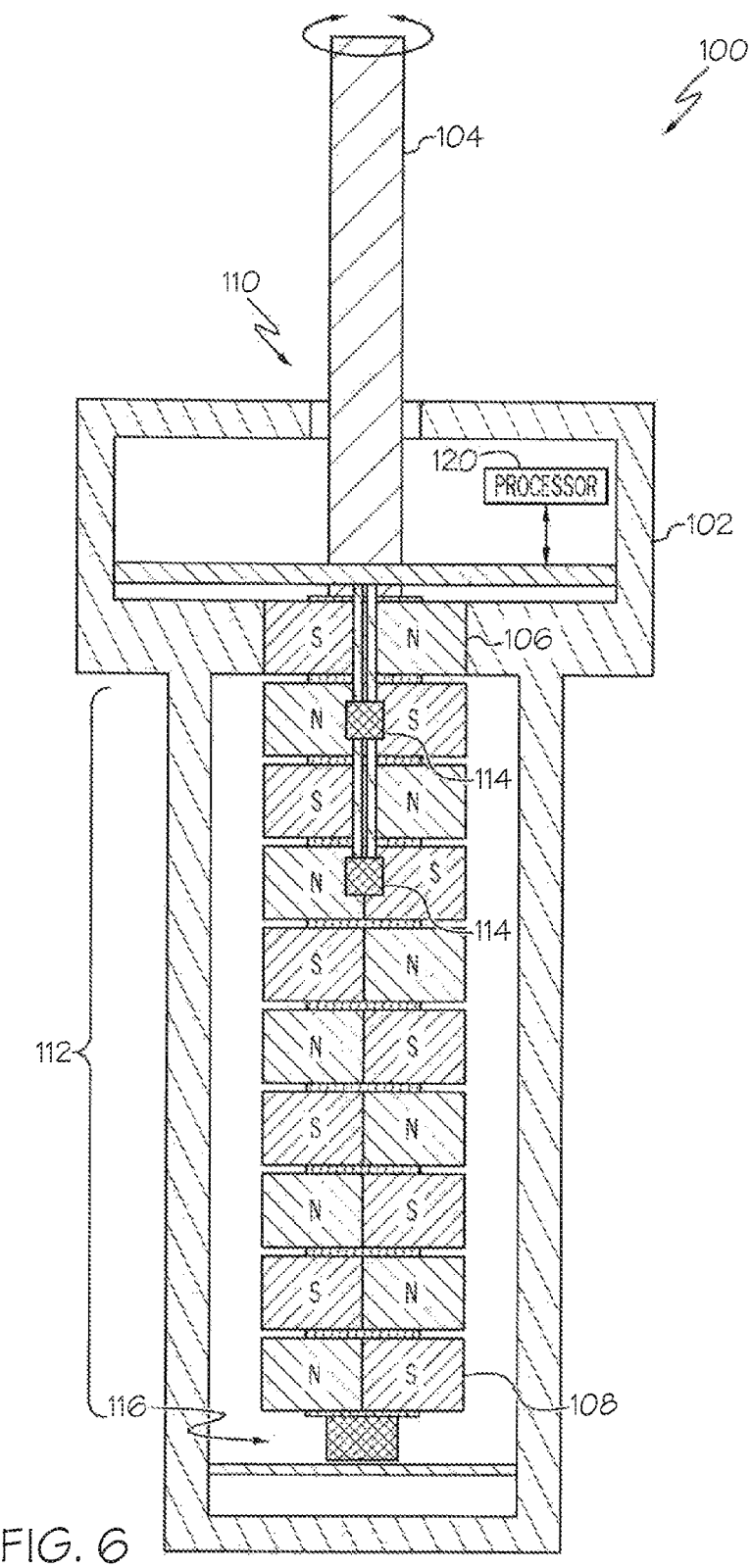
Figure 7:
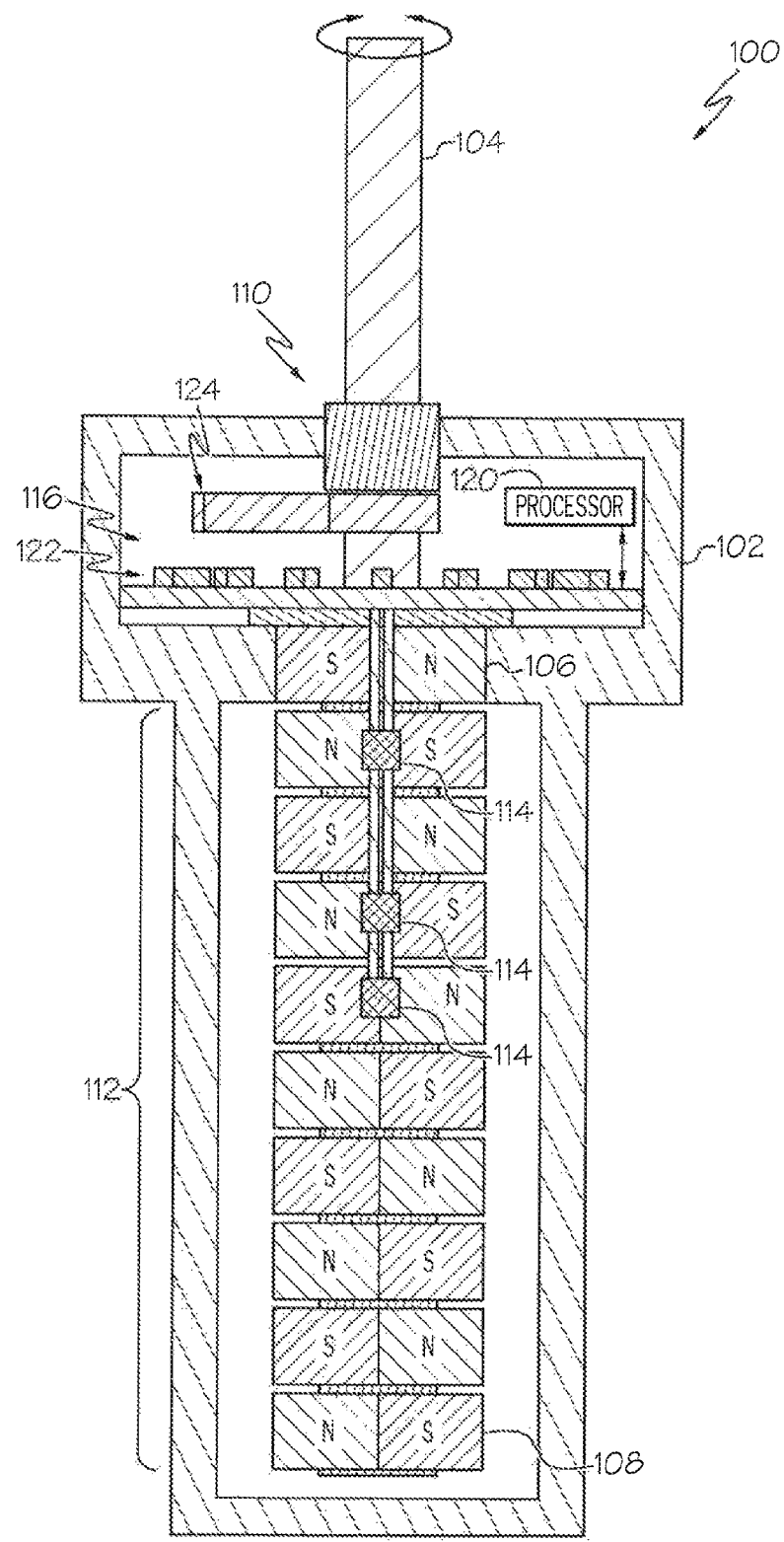

The multi-turn angular position sensor system 100, and its associated variations, described above each include a single rotational zone sensor 114. In other embodiments, the multi-turn angular position sensor system 100 may be implemented with multiple rotational zone sensors. The alternative embodiments, which are depicted in FIGS. 5-7, will now be described. In doing so, it is noted that the reference numerals in FIGS. 5-7 that are identical to those used in FIGS. 1-4 refer to identical components. As such, detailed descriptions of those identical components will not be repeated herein.

Turning to FIG. 5, the multi-turn angular position sensor system 100 depicted therein also includes a multi-turn position sensor 110 and a processor 120. The multi-turn position sensor 110 includes the fixed structure 102, the shaft 104, the fixed magnet 106, the shaft magnet 108, the plurality of rotatable magnets 112, and the shaft rotation sensor 116. The main difference is that instead of a single rotational zone sensor 114 the depicted sensor 110 includes a plurality of rotational zone sensors 114.

The rotational zone sensors 114 are disposed adjacent to a different one of the rotatable magnets 112, and are in operable communication with the processor 120. The zone sensors 114 are configured to supply zone sensor output signals to the processor 120 that are representative of the unique rotation zone of the shaft 104. It will be appreciated that the number and type of rotational zone sensors 114 may vary. For example, in the embodiment depicted in FIGS. 5 and 6, the system 100 includes two rotational zone sensors 114. In other embodiments, such as the one depicted in FIGS. 7 and 8, the system 100 includes three rotational zone sensors 114. In both of these embodiments the rotational zone sensors 114 are implemented using Hall sensors. It will be appreciated, however, that other types of sensors could also be used, if needed or desired. No matter the particular type of sensor that is used to implement the rotational zone sensors 114, and as will be described in more detail further below, the zone sensor output signals supplied thereby are representative of a binary code that identifies the unique rotation zone of the shaft 104.

Figure 2:
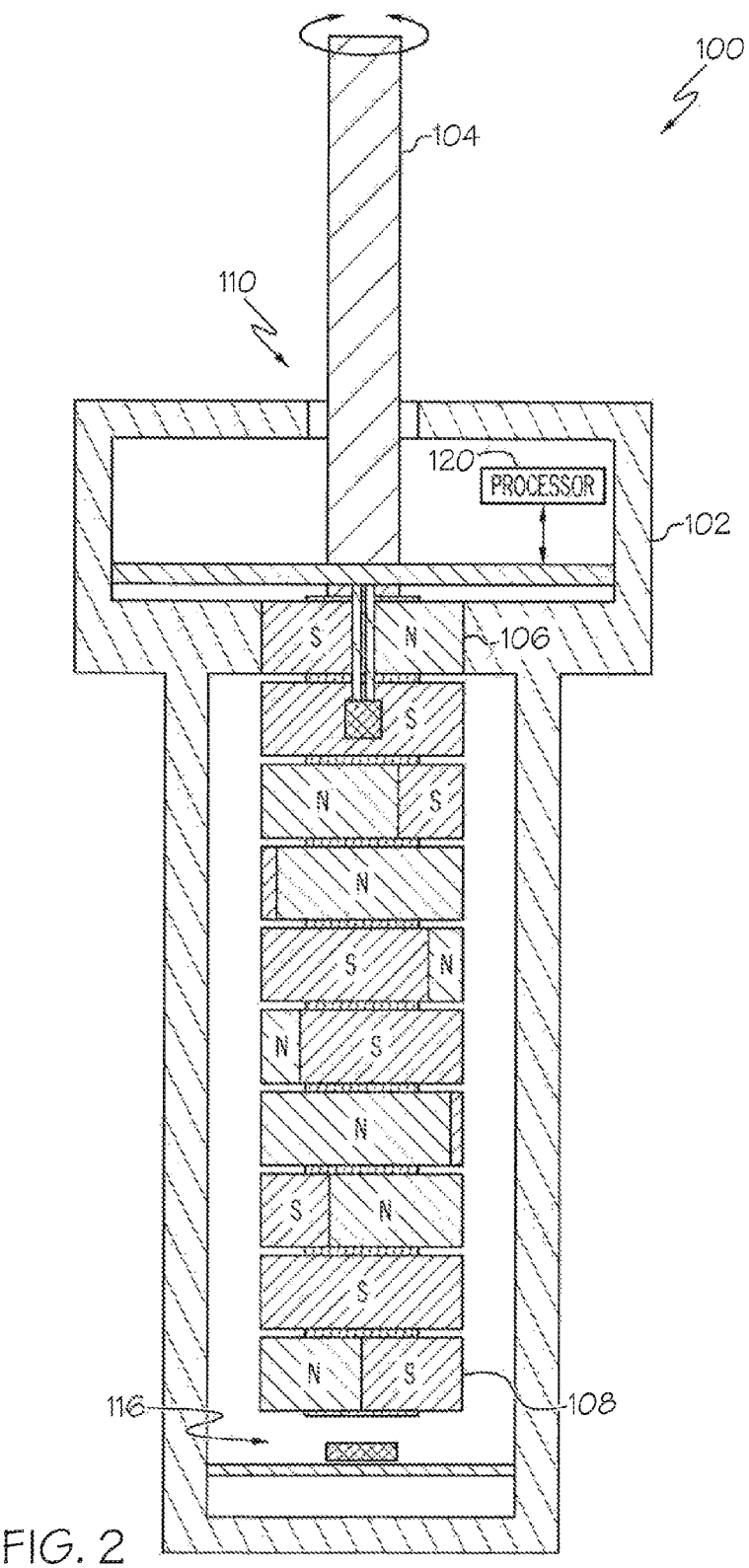
Figure 8:
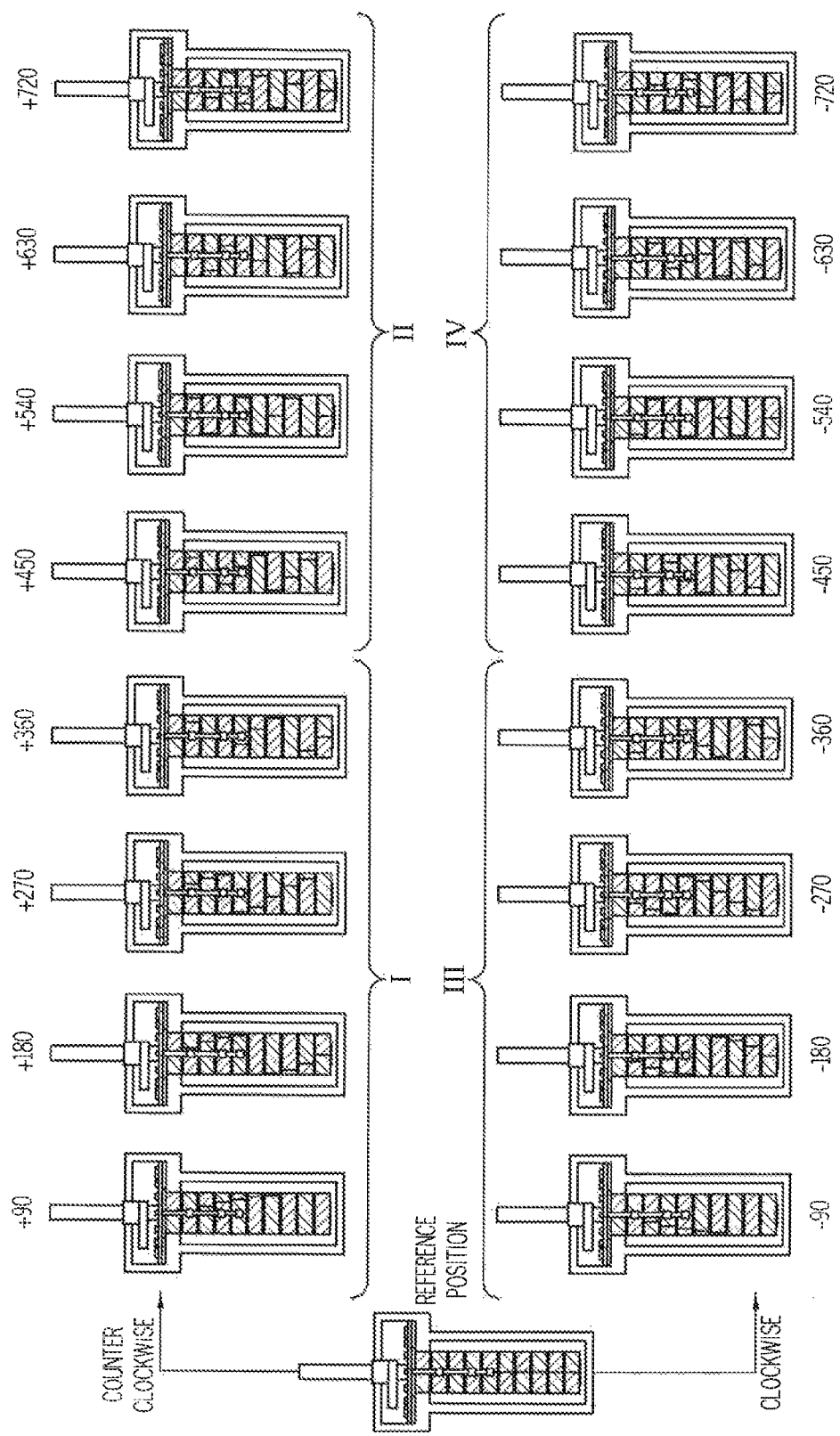
FIG. 8 depicts the multi-turn angular position sensor of FIG. 7 in multiple rotational positions.

Having described the difference in the overall structure of the multi-turn angular position sensing system 100 depicted in FIGS. 5-7 from the system depicted in FIGS. 1-3, a description will now be provided as to how the system 100 of FIGS. 5-7 senses the rotational position of the shaft 104. In doing so, reference should be made to FIGS. 8 and 9. FIG. 8 depicts the positions of the shaft magnet 108 and rotatable magnets 112 when the shaft 104 is rotated, in 90-degree increments, in both the clockwise and counter clockwise direction. FIG. 9 is a table that depicts the zone sensor output signals at each of the 90-degree rotational increments, and how these zone sensor output signals are used to determine the rotation zone of the shaft 104. It should be noted that "Zone Sensor #1" in FIG. 9, refers to the zone sensor output signal supplied by the uppermost rotational zone sensor 114 in FIG. 8, "Zone Sensor #2" refers to the zone sensor output signal supplied by the middle rotational zone sensor 114 in FIG. 8, and "Zone Sensor #3" in FIG. 9, refers to the zone sensor output signal supplied by the lowermost rotational zone sensor 114 in FIG. 8.

As FIGS. 4 and 5 depict, when the shaft 104 is in the reference position, each of the zone sensor output signals could be either a "1" or a "0," it matters not. Thus, each of these outputs is labeled as a "Don't Care." The shaft rotation output signal, supplied by the shaft rotation sensor 116, is used by the processor 120 to determine that the shaft 104 is in the reference position.

When the shaft 104 is rotated, from the reference position, in the counterclockwise direction toward and through the +90-, +180-, +270-degree positions, and to the +360-degree position (e.g., one complete rotation), the zone sensor output signals transition to "001." This binary code is used by the processor 120 to determine the rotation zone. In the depicted embodiment, the 001 code indicates that the shaft 104 is in rotation zone I. Again, the shaft rotation output signal, supplied by the shaft rotation sensor 116, is used by the processor 120 to determine the specific rotational position of the shaft 104 within rotation zone I. Thereafter, if the shaft 104 is rotated in the counterclockwise direction beyond +360-degrees, toward and through the +450-, +544-, +630-degree positions, and to the +720-degree position (e.g., two complete rotations), the zone sensor output signals transition to "000," though at the +540-degrees the output of zone sensor #2 is a "Don't Care." This binary code is used by the processor 120 to determine that the shaft 104 is in rotation zone II.

Now, when the shaft 104 is rotated, from the reference position, in the clockwise direction toward and through the −90-, −180-, −270-degree positions, and to the −360-degree position (e.g., one complete rotation), the zone sensor output signals transition to "110." This binary code is used by the processor 120 to determine the rotation zone. In the depicted embodiment, the 110 code indicates that the shaft 104 is in rotation zone III. Again, the shaft rotation output signal, supplied by the shaft rotation sensor 116, is used by the processor 120 to determine the specific rotational position of the shaft 104 within rotation zone III. Thereafter, if the shaft 104 is rotated in the counterclockwise direction beyond −360-degrees, toward and through the −450-, −544-, −630-degree positions, and to the −720-degree position (e.g., two complete rotations), the zone sensor output signals transition to "111," though at the −540-degrees the output of zone sensor #2 is a "Don't Care." This binary code is used by the processor 120 to determine that that the shaft 104 is in rotation zone IV.

The multi-turn position sensing system 100 described herein provides a minimum sensing range of 1440-degrees, and exhibits reliability, stability, and accuracy that is sufficient for at least various automotive and other vehicular transport systems.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-turn angular position sensor, comprising:
   a fixed structure;
   a fixed magnet non-rotationally coupled to the fixed structure;
   a shaft configured to rotate, relative to the fixed structure, multiple complete rotations from a reference position, each complete rotation from the reference position in a rotational direction defining a unique rotation zone of the shaft;
   a shaft magnet coupled to the shaft and configured to rotate therewith;
   a plurality of rotatable magnets surrounding the shaft and disposed between the shaft magnet and the fixed magnet, each rotatable magnet configured, upon rotation of the shaft magnet, to rotate a different number of angular degrees than the shaft magnet, the plurality of magnets including a zone sensor magnet that rotates no more than one complete rotation from the reference position when the shaft rotates the multiple complete rotations from the reference position;
   a rotational zone sensor disposed adjacent the zone sensor magnet, the rotational zone sensor configured to supply a zone sensor output signal that indicates the unique rotation zone of the shaft; and
   a shaft rotation sensor disposed adjacent the shaft and configured to supply a shaft rotation output signal representative of a number of angular degrees that the shaft rotates within each unique rotation zone.

2. The system of claim 1, wherein:
   each of the rotatable magnets supplies a magnetic force; and
   each rotatable magnet rotates in response to the magnetic force supplied thereto from adjacent magnets.

3. The system of claim 1, wherein the rotational zone sensor comprises a Hall sensor.

4. The system of claim 3, wherein the zone sensor output signal is an analog signal that identifies the unique zone of rotation of the shaft.

5. The system of claim 1, wherein the shaft rotation sensor comprises a 360-degree Hall sensor.

6. The system of claim 5, wherein the 360-degree Hall sensor is disposed adjacent the shaft magnet to sense rotations thereof.

7. The system of claim 1, wherein the shaft rotation sensor comprises an anisotropic magnetic resistive (AMR) array.

8. The system of claim 7, further comprising a sensor magnet coupled to the shaft and rotatable therewith, the sensor magnet disposed adjacent to the AMR array.

9. The system of claim 1, wherein the shaft is configured to rotate N-number of complete rotations from the reference point in each direction, thereby providing (720×N)-degrees of rotational position sensing capability.

10. The system of claim 9, wherein:
    N is 2; and
    the plurality of rotatable magnets is 8.

11. A multi-turn angular position sensor system, comprising:
    a fixed structure;
    a fixed magnet non-rotationally coupled to the fixed structure;
    a shaft configured to rotate, relative to the fixed structure, multiple complete rotations from a reference position, each complete rotation from the reference position in a rotational direction defining a unique rotation zone of the shaft;
    a shaft magnet coupled to the shaft and configured to rotate therewith;
    a plurality of rotatable magnets surrounding the shaft and disposed between the shaft magnet and the fixed magnet, each rotatable magnet configured, upon rotation of the shaft magnet, to rotate a different number of angular degrees than the shaft magnet, the plurality of magnets including a zone sensor magnet that rotates no more than one complete rotation from the reference position when the shaft rotates the multiple complete rotations from the reference position;
    a rotational zone sensor disposed adjacent the zone sensor magnet, the rotational zone sensor configured to supply a zone sensor output signal that indicates the unique rotation zone of the shaft;
    a shaft rotation sensor disposed adjacent the shaft and configured to supply a shaft rotation output signal representative of a number of angular degrees that the shaft rotates within each unique rotation zone; and
    a processor coupled to receive the zone sensor output signal and the shaft rotation output signal and configured, upon receipt thereof, to determine rotational position of the shaft.

12. The system of claim 11, wherein:
    each of the rotatable magnets supplies a magnetic force; and
    each rotatable magnet rotates in response to the magnetic force supplied thereto from adjacent magnets.

13. The system of claim 11, wherein:
    the rotational zone sensor comprises a Hall sensor; and
    the zone sensor output signal is an analog signal that identifies the unique zone of rotation of the shaft.

14. The system of claim 11, wherein the shaft rotation sensor comprises a 360-degree Hall sensor disposed adjacent the shaft magnet to sense rotations thereof.

15. The system of claim 11, wherein the shaft rotation sensor comprises:
    a sensor magnet coupled to the shaft and rotatable therewith; and
    an anisotropic magnetic resistive (AMR) array disposed adjacent the sensor magnet.

16. A multi-turn angular position sensor system, comprising:
    a fixed structure;
    a fixed magnet non-rotationally coupled to the fixed structure;

a shaft configured to rotate, relative to the fixed structure, N-number of complete rotations from a reference position in a rotational direction, each complete rotation from the reference position in the rotational direction defining a unique rotation zone of the shaft;

a shaft magnet coupled to the shaft and configured to rotate therewith;

a plurality of rotatable magnets surrounding the shaft and disposed between the shaft magnet and the fixed magnet, each rotatable magnet supplying a magnetic force, and each rotatable magnet configured, upon rotation of the shaft magnet and in response to the magnetic force supplied thereto from adjacent rotatable magnets, to rotate a different number of angular degrees than the shaft magnet, the plurality of magnets including a zone sensor magnet that rotates no more than one complete rotation from the reference position when the shaft rotates the multiple complete rotations from the reference position;

a rotational zone sensor disposed adjacent the zone sensor magnet, the rotational zone sensor configured to supply a zone sensor output signal that indicates the unique rotation zone of the shaft;

a shaft rotation sensor disposed adjacent the shaft and configured to supply a shaft rotation output signal representative of a number of angular degrees that the shaft rotates within each unique rotation zone; and a processor coupled to receive the zone sensor output signal and the shaft rotation output signal and configured, upon receipt thereof, to determine rotational position of the shaft.

17. The system of claim 16, wherein:
the rotational zone sensor comprises a Hall sensor; and
the zone sensor output signal is an analog signal that identifies the unique zone of rotation of the shaft.

18. The system of claim 16, wherein the shaft rotation sensor comprises a 360-degree Hall sensor disposed adjacent the shaft magnet to sense rotations thereof.

19. The system of claim 16, wherein the shaft rotation sensor comprises:
a sensor magnet coupled to the shaft and rotatable therewith; and
an anisotropic magnetic resistive (AMR) array disposed adjacent the sensor magnet.

20. A multi-turn angular position sensor, comprising:
a fixed structure;
a fixed magnet non-rotationally coupled to the fixed structure;
a shaft configured to rotate, relative to the fixed structure, multiple complete rotations from a reference position, each complete rotation from the reference position in a rotational direction defining a unique rotation zone of the shaft;
a shaft magnet coupled to the shaft and configured to rotate therewith;
a plurality of rotatable magnets surrounding the shaft and disposed between the shaft magnet and the fixed magnet, each rotatable magnet configured, upon rotation of the shaft magnet, to rotate a different number of angular degrees than the shaft magnet;
a plurality of rotational zone sensors, each of the rotational zone sensors disposed adjacent a different one of the rotatable magnets, the rotational zone sensors configured to supply zone sensor output signals representative of the unique rotation zone of the shaft; and
a shaft rotation sensor disposed adjacent the shaft and configured to supply a shaft rotation output signal representative of a number of angular degrees of rotation within the unique rotation zone of the shaft.

* * * * *